United States Patent [19]
Derham et al.

[11] Patent Number: 5,378,401
[45] Date of Patent: Jan. 3, 1995

[54] PREPARATION OF ZINC POLYPHOSPHATE IN HIGH PH SOLUTION

[75] Inventors: James J. Derham, Ft. Washington, Pa.; Joseph E. Lubitsky, Cinaminson, N.J.; William C. Flanagan, Exton, Pa.

[73] Assignee: Klenzoid, Inc., Conshohocken, Pa.

[21] Appl. No.: 828,749

[22] Filed: Jan. 31, 1992

[51] Int. Cl.$^6$ ............................................. C23F 11/167
[52] U.S. Cl. ...................................... 252/387; 422/18; 423/306
[58] Field of Search ............... 252/389.2, 387; 422/18; 423/306, 308

[56] References Cited

U.S. PATENT DOCUMENTS 4,089,651  5/1978  Scott .................. 252/389.2
4,692,315  9/1987  Greaves et al. .......... 252/389.2

Primary Examiner—Robert L. Stoll
Assistant Examiner—Valerie Fee
Attorney, Agent, or Firm—Armand M. Vozzo, Jr.

[57] ABSTRACT

An improved method is disclosed for preparing zinc polyphosphate in a stable, concentrated solution, for water treatment purposes having a pH above 7.0 and in a preferred range of pH between 8.0 and 10.0. Without any acid solubilization required, an approximate 60% solution of tetrapotassium pyrophosphate (TKPP) is formulated and mixed thoroughly in a tank or similar container. Under constant stirring, a predetermined aqueous solution of a normal zinc salt, such as zinc chloride, gradually injected and mixed together into the TKPP solution at a preferred rate of about 5% of the zinc salt solution per minute and in a sufficient amount determined to add about 1 part of zinc to between 5-8 parts of TKPP by weight for maximum corrosion protection. After allowing sufficient time for full reaction of the mixture, the resulting product is a clear, colorless liquid containing zinc polyphosphate and a potassium salt in alkaline solution that may be fed directly into a water distribution system as an effective corrosion protective additive.

21 Claims, No Drawings

PREPARATION OF ZINC POLYPHOSPHATE IN HIGH PH SOLUTION

BACKGROUND OF THE INVENTION

The present invention relates to formulations of blended phosphates, particularly those of zinc, and more particularly to an improved preparation of concentrated zinc polyphosphate provided in a stable, alkaline solution having a relatively high pH factor.

Industrial and municipal water supply systems have traditionally been plagued by corrosion problems that adversely affect not only the physical elements of such systems but more importantly the chemical quality of the water. Besides causing deterioration of water mains and other structural members, corrosion in water supply systems can raise the iron concentration of the raw water manifesting so-called "red-water" problems at the point of use and further result in an inability to retain a satisfactory level of chlorine in the water supply due to its loss by chemical reaction with resulting iron oxides. Present water supply systems generally employ continuous monitoring of the water quality and use well-known indicators, such as the Langelier and Ryznar indices, to assess the tendency of the in-line aqueous liquid to be scaleforming or corrosive. By seeking to balance the Langelier saturation index to zero and/or minimize the Ryznar stability index, the characteristic qualities of the supply water that tend to increase its corrosive tendencies, such as low pH factor and decreased alkalinity, can be favorably controlled. Such corrosion-preventive controls within water treatment systems have proven somewhat successful but costly, with the most generally accepted treatment being the controlled addition of corrosion inhibitors.

Some of the most effective corrosion inhibitors being used currently as additives in water systems are blended phosphate-based chemicals including those categorized as orthophosphates and polyphosphates. The orthophosphates are formulations of phosphate salts which are generally produced by the neutralization of phosphoric acid with an alkali metal and which serve to contribute to the process of corrosion inhibition as water softeners and detergent agents. The polyphosphates are complex derivatives of orthophosphates that are converted typically by calcination, to form a chain arrangement of phosphate ions ($PO_3^-$) held together by P-O-P linkages. These polyphosphates are especially useful in water treatment as effective complexing or sequestering agents that essentially tie-up certain metallic ions in soluble complexes, effectively removing them from the aqueous liquid and preventing their formation of undesirable precipitates or the occurrence of other detrimental side reactions. For example, the complexation of calcium ions using polyphosphates reduces the saturation state of calcium carbonate in the treated water and thereby inhibit scale deposits. Further, the complexation of iron and manganese ions decreases the tendency of water to form stains by inhibiting their oxidation and the resulting precipitation of hydrous oxides of these metals. As a result, polyphosphates are widely used and generally relied upon to clean water mains and reduce "red water" problems that can affect major water supply systems.

The blended phosphate products commonly used for water treatment comprise combinations of the extended chain polyphosphate and orthophosphate chemicals with the intended effect being to provide both the basic corrosion-inhibiting properties of the orthophosphate ions and the sequestering abilities of the polyphosphate. The polyphosphates, however, can break down or hydrolyze over time into a mixture of shorter chain length phosphates and orthophosphate ions. This occurrence, commonly called reversion, is a function of the water chemistry (the pH and metal ions present), its temperature, and the particular type of phosphate chains involved in the water treatment. Since the reversion process adversely affects the overall corrosion-inhibiting properties of the blended phosphate products, improved commercial formulations have developed, particularly employing zinc polyphosphates, that have proven to inhibit the reversion mechanism by controlled addition of metal zinc to the water treatment process. Use of these zinc polyphosphate formulations, however, have been somewhat problematic due to the requirement that they be blended in an acidic environment, generally having a pH factor below 2.0, in order to solubilize the zinc with the polyphosphate ions and reduce undesirable precipitate formations of zinc phosphate or zinc hydroxide. Higher, more effective concentrations of zinc polyphosphate require even more acidic solutions that can actually hasten the reversion process and increase the amount of undesirable precipitates. Of course, the introduction of any acidic solution in the water treatment process will lower the pH factor and reduce the alkalinity of the raw water supply, and, as indicated by both the Langelier and Ryznar formulae, thereby increase the corrosiveness of the water being treated.

While the use of zinc polyphosphates as a corrosion-inhibiting additive remains vital in water treatment systems, their solubilization and continued introduction in acidic solutions can be counter-productive as a corrosion protective treatment. In addition, the strongly acidic solutions heretofore required for effective solubilization of the zinc and polyphosphates ions in high concentrations are very unstable, highly dangerous and further present a variety of safety problems in handling and distribution. A need exists, therefore, for an effective non-acidic preparation of a zinc polyphosphate solution for general use in water treatment systems.

SUMMARY OF THE INVENTION

Accordingly, it is a general purpose and object of the present invention to provide an improved preparation of zinc polyphosphate in a stable, alkaline solution for use as a corrosion protective additive in water treatment systems.

Another object of the present invention is to provide an effective method of preparing a zinc polyphosphate solution without any acid solubilization that is stable at a pH above 7.0.

Still another object of the present invention is to provide a method of solubilizing zinc with phosphate ions in relatively high concentrations without use of an acid solvent so as to produce a safe and effective solution for corrosion protection in industrial and municipal water supply systems.

A still further object of the present invention is to provide a corrosion protective additive that is simple to prepare, stable in its solution, and safe and easy to handle and distribute within water treatment systems.

Briefly, these and other objects of the present invention are accomplished by an improved method of preparing zinc polyphosphate in a stable, concentrated solution, for water treatment purposes having a pH above 7.0 and in a preferred range of pH between 8.0 and 10.0. Without any acid solubilization required, an approximate 60% solution of tetrapotassium pyrophosphate (TKPP) is formulated and mixed thoroughly in a tank or similar container. Under constant stirring, an aqueous solution of a normal zinc salt, such as zinc chloride, is gradually injected and mixed into the TKPP solution at a gradual rate of about 5% of the zinc salt solution per minute and in a sufficient amount determined to introduce about 1 part of zinc to between 5–8 parts of TKPP by weight for maximum corrosion protection. After allowing sufficient time for full reaction of the mixture, the final product is a clear, colorless liquid of zinc polyphosphate and a potassium salt in alkaline solution that may be fed directly into a water distribution system as an effective corrosion protective additive.

Other objects, advantages and novel features of the present invention will become apparent from the following detailed description thereof.

DESCRIPTION OF THE PREFERRED EMBODIMENT

The present invention is an improved preparation of zinc polyphosphate in a stable solution that is clear, colorless and non-acidic for safe and effective use as a corrosion protective additive in water treatment systems. Zinc polyphosphate has known corrosion inhibition properties but heretofore has not been available, either in solution or in dry blends, having other than an acidic quality. The present preparation yields a stable solution containing zinc polyphosphate as an active ingredient in concentrations of up to about 25 % of zinc polyphosphate by weight and having an alkaline character evidenced by a pH factor above 7.0 and preferably between 8.0 and 10.0. In such an alkaline solution, the present preparation of zinc polyphosphate may be fed safely and directly into water distribution systems to provide the raw water supply with a most effective corrosion inhibitor that further enhances corrosion control because of its alkaline solution.

In accordance with the present invention and the working examples set forth below, the zinc polyphosphate solution is prepared using a solution of tetrapotassium pyrophosphate (TKPP) that is premixed thoroughly at or near standard room temperatures of between 20°–25° C. The amount of TKPP present in the initial solution may vary depending upon the level of concentration of zinc polyphosphate desired in the final product, and is generally between about 35–60% by weight as detailed and explained in examples set forth below. After premixing the TKPP solution for a sufficient period of time, typically about 10 minutes, so as to form a homogeneous liquid, a solution of a normal zinc salt is gradually injected into the TKPP solution at a rate of about 5 % of the total zinc salt solution per minute. Suitable zinc salts for use herein include zinc chloride, zinc nitrate, zinc sulfate and other normal salts of zinc that yield essentially basic aqueous solutions. The concentration of the zinc salt contained in solution may vary somewhat again dependent upon the ultimate zinc polyphosphate concentration desired, but, as indicated below, is preferably in the range of about 50% by weight. Initially during the controlled injection of the zinc salt solution, a gelatinous white floc composed essentially of zinc hydroxide is formed. Subsequently in time, however, while under continued stirring, for a total period of about 2 hours from the start of the injection of the zinc salt solution, the zinc hydroxide fully dissolves as the zinc ions in solution are sequestered thereby yielding the clear, colorless solution of the present invention.

Regarding specific ingredients employed in the present invention, the TKPP solution used to initiate the preparation may be obtained directly in the requisite concentration or formulated by mixing an associated amount of TKPP material, generally available in granular form, into a quantity of water. TKPP is commercially known and used as a detergent material and available both in solution, typically about 60% in water, that is a clear, slightly viscous liquid and in an anhydrous, hygroscopic, white granular form readily soluble in water. One TKPP material suitable for use in the present preparation is manufactured and commercially available from the Monsanto Chemical Company.

The zinc salts referred to herein and employed in the present invention are generally known and commercially available compounds of zinc. As indicated in the working examples set forth below, a preferred zinc salt in the present preparation is zinc chloride which is commonly used as a drying agent and catalyst and available either in granular form or in aqueous solution. In its granular form, zinc chloride is readily soluble in water so that the aqueous solution described herein for use in the present preparation may be produced by appropriate mixture of the zinc chloride in water. Alternatively, various concentrations of zinc chloride solutions generally available from commercial suppliers may be used directly in the present preparation and modified, if necessary, to adjust the level of their concentrations prior to use. Suitable solutions of the zinc chloride for direct injection into the present preparation are available, for example, from the Mineral Research and Development Corp.

For a better understanding of the present invention, specific examples are given hereinbelow with associated test results as illustration of the improvement provided by the product preparation.

EXAMPLE I

An aqueous solution of 35% TKPP is mixed thoroughly in a conventional mixing tank to form a homogeneous solution with mixing time being about 10 minutes. Thereafter and while stirring continuously, an aqueous solution containing 50% zinc chloride by weight is added to the TKPP solution in an amount sufficient to introduce 1 part of zinc to 5 parts of TKPP by weight. The zinc chloride solution is gradually injected into the TKPP solution at the rate of about 5 % of the total zinc chloride solution per minute. During the gradual injection of the zinc chloride solution, it is initially observed that a gelatinous white floc is formed in the mixture, the floc being composed essentially of zinc hydroxide. Upon continued mixing for about a two-hour period, the TKPP acts to sequester the zinc from the zinc hydroxide and the floc formation dissipates to yield a clear, colorless solution of zinc polyphosphate. The resulting solution containing zinc polyphosphate as an active ingredient along with potassium chloride is alkaline in nature exhibiting a pH factor of between 9.0 and 9.4.

While the sequestration properties of TKPP are relatively well known with regard to metal ions, it should be noted that the interaction of the TKPP in the present preparation with the zinc chloride is believed to result in a unique formation of un-ionized zinc polyphosphate molecules that are more readily soluble in water and that exhibit a greater ability to remain in the final product during storage and application. The combination of zinc and polyphosphate ions produced by the present preparation clearly evidence a synergistic effect with respect to the individual corrosion-inhibiting properties of zinc and polyphosphate alone. In this regard, a 24-hour corrosion test was conducted using a series of steel test strips allowed to stand in various aqueous solutions containing zinc chloride, polyphosphate and the present product preparation, respectively. As is evident from the data tabulated below, particularly that in Table III, the present product preparation provides significantly greater corrosion protection than the zinc or phosphate solutions individually.

TABLE I

| | (Zinc Chloride) | |
|---|---|---|
| Test Strip No. | Zinc Chloride Concentration (ppm) | Weight Loss (mg) |
| 1 | 0 | 18 |
| 2 | 1 | 19 |
| 3 | 2 | 17 |
| 4 | 3 | 18 |
| 5 | 4 | 16 |
| 6 | 5 | 16 |

TABLE II

| | (Polyphosphate) | |
|---|---|---|
| Test Strip No. | Polyphosphate Concentration (ppm) | Weight Loss (mg) |
| 1 | 0 | 18 |
| 2 | 4 | 16 |
| 3 | 8 | 14 |
| 4 | 12 | 13 |
| 5 | 16 | 12 |
| 6 | 20 | 12 |

TABLE III

| | (Zinc Polyphosphate Preparation) | |
|---|---|---|
| Test Strip No. | Concentration (ppm) | Weight Loss (mg) |
| 1 | 0 | 20 |
| 2 | 4 | 4 |
| 3 | 8 | 2 |
| 4 | 12 | 1 |
| 5 | 16 | 2 |
| 6 | 20 | 1 |

A further test conducted using the present product preparation in a simulated municipal water system environment evidences the substantial corrosion protection provided by the preparation, particularly by the depositing of a thin microscopic cathodic inhibitor onto exposed metal surfaces. Separate strips of metal similar to those of standard water mains were immersed for 48 hours in water baths all having a pH of 7.2 and a negative saturation index of −1.34, but each having an increasing concentration of the present product preparation added to the baths. For each respective concentration in parts per million, there is tabulated below in Table IV the weight loss in milligrams, the milligrams per year (MPY) loss and the percentage protection experienced by each strip.

TABLE IV

| Test Strip | Concentration | Wt. Loss | MPY Loss | Protection |
|---|---|---|---|---|
| 1 | -0- | 31 mg | 15 | -0- |
| 2 | 3 ppm | 16 mg | 7.4 | 49% |
| 3 | 4 ppm | 10 mg | 4.8 | 68% |
| 4 | 5 ppm | 5 mg | 2.4 | 84% |
| 5 | 6 ppm | 3 mg | 1.45 | 91% |
| 6 | 7 ppm | 1 mg | 0.96 | 94% |

As is indicated by the data tabulated immediately above, relatively low concentrations (3–4 ppm) of the present product preparation can significantly increase corrosion protection to water mains and associated elements, with higher concentration (6–7 ppm) providing substantially complete system protection against corrosion and its other adverse effects.

Independent field testing conducted by the a private water company servicing an eastern U.S. municipality compared a sample of the present product preparation as obtained in Example 1 with several commercially available water treatment products including a long chain polymerized sodium polyphosphate, two different zinc orthophosphates each with an acidic pH, and a zinc polyphosphate product having an acidic pH. Results of such testing conducted under normal municipal water distribution conditions for about a two-month period indicated that samples treated with the Example 1 preparation exhibited the lowest percent loss to corrosion and the lowest average percent loss per year.

EXAMPLE 2

Preparation of the zinc polyphosphate solution is performed following the procedure described in foregoing Example 1 except that a 60% TKPP solution is utilized as a starting solution and the 50% zinc chloride solution is added in an amount sufficient to introduce 1 part of zinc to 8 parts of the TKPP by weight. The resulting solution containing zinc polyphosphate as an active ingredient exhibits high pH of about 9.4 and upon application, provides corrosion protective properties and produces associated test results similar to those obtained in the case of Example 1.

It should be understood that further examples of the present preparation in which smaller amounts of zinc in ratio by weight to the TKPP may be mixed in solution in accordance with the procedure described in Example 1 are within the teaching of the present invention. Such described examples would be expected to provide the effective corrosion inhibiting qualities of zinc polyphosphate with the increased protection attributable to its preparation and treatment in an alkaline solution in accordance with the present invention.

Most effective use of the present product preparation as a water treatment additive is by directly feeding the product in its liquid form into the water distribution system subject to treatment. For consistent protection against corrosion, the present product preparation in the described solution should be fed on a continuous basis to the distribution system at feed rates of between 3–7 ppm dependent upon the determined corrosive water quality conditions being treated.

Therefore, some of the many advantages of the present invention should now be apparent. Generally, the present invention provides an improved preparation of concentrated levels of zinc polyphosphate in a stable, alkaline solution for use as a corrosion protective additive in water treatment systems. The present invention further provides an effective method of preparing a zinc polyphosphate solution without acid solubilization so that the resulting solution exhibits a pH factor above 7.0 that is more conducive to corrosion and scale control. As a further result, the present preparation provides a safe and effective alkaline solution of zinc with polyphosphate ions for safe and general use as a corrosion inhibitor in industrial and municipal water supply systems.

Obviously, other embodiments and modifications of the present invention will readily come to those of ordinary skill in the art having the benefit of the teachings presented in the foregoing description. For example, sufficient amounts of metallic zinc in finely ground powder may be directly added to the TKPP solution and solubilized therein to produce the alkaline solution of zinc polyphosphate rather than by the described addition and reaction of the zinc salt. Also, the rate of introduction of the zinc, either directly in powder form or via the zinc salt solution, may be varied somewhat from that described in the foregoing Examples but should remain gradual over the full injection to minimize floc formation and allow complete sequestration of the zinc ions in the resulting solution. Furthermore, additional corrosion inhibitor compounds, such as orthophosphates and polyorthophosphates of zinc and the like, may be added to the foregoing described preparation in minor amounts without adversely affecting the high pH thereof and solubilized therein according to the present invention to modify and enhance corrosion protective treatments in certain water distribution systems. It is therefore to be understood that various changes in the details, materials and steps in the present preparation, which have been described to explain the nature of the invention, may be made by those skilled in the art within the principle and scope of the invention as expressed in the appended claims.

What is claimed is:

1. A stable, alkaline solution of zinc polyphosphate having a pH of above 7 prepared by a process comprising the steps of:
   while continuously stirring a starting aqueous solution containing 35–60% by weight tetrapotassium pyrophosphate (TKPP);
   introducing a predetermined amount of a soluble zinc salt into said starting solution at a gradual rate, the amount of zinc introduced thereby being from about 12.5% to about 20% by weight of the TKPP in said starting solution; and
   mixing the resulting solution for an extended time until said resulting solution is clear and colorless.

2. The solution according to claim 1, wherein said step of adding an amount of zinc comprises:
   injecting an aqueous solution of a normal zinc salt selected from the group consisting of zinc chloride, zinc sulfate and zinc nitrate.

3. The solution according to claim 2, wherein said normal zinc salt in aqueous solution is zinc chloride.

4. The solution according to claim 3, wherein said gradual rate for injecting said zinc chloride solution is about 5% of the total zinc chloride solution per minute.

5. The solution prepared according to claim 4, wherein said extended time for mixing the resulting solution is about two hours.

6. The solution according to claim 4, further comprising a minor amount of a corrosion inhibitor compound selected from the group consisting of orthophosphate and ortho-polyphosphate products sufficient to maintain the alkaline nature of said resulting solution, added to said resulting solution.

7. The solution according to claim 4, wherein,
   said aqueous solution contains about 50% zinc chloride by weight.

8. The solution according to claim 1, where the step of introducing comprises introducing metallic zinc into said starting solution, and allowing said metallic zinc to solubilize.

9. A method of preparing a concentrated aqueous solution of zinc polyphosphate having a pH of above 7, comprising the steps of:
   reacting with agitation, an aqueous solution of a zinc salt with a solution of tetrapotassium pyrophosphate (TKPP) having a concentration of about 35 to 60% by weight, and continuing agitation until the resulting solution is clear and colorless, the weight ratio of TKPP to zinc in the resulting solution being about 5:1 to about 8:1.

10. A method according to claim 9, wherein said step of reacting comprises:
    adding said zinc solution into an aqueous TKPP solution gradually while continuously stirring.

11. A method according to claim 10, wherein said step of adding said zinc solution comprises:
    injecting at a gradual rate an aqueous solution of a normal zinc salt selected from the group consisting of zinc chloride, zinc sulfate and zinc nitrate.

12. A method according to claim 11, wherein said gradual rate for injecting said aqueous solution of the normal zinc salt is about 5% of the total zinc salt solution per minute.

13. A method according to claim 12, wherein said extended time for mixing the resulting liquid is about two hours.

14. A method according to claim 11, wherein said normal zinc salt is zinc chloride.

15. A method according to claim 14, wherein,
    said zinc chloride solution contains about 50% zinc chloride by weight.

16. The solution according to claim 15, having a pH of about 8.0 to 10.0.

17. A method according to claim 9, wherein the concentrated aqueous solution has a pH of about 8.0 to 10.0.

18. A method according to claim 9, wherein said aqueous solution of a zinc salt is formed by solubilizing metallic zinc in said TKPP solution.

19. A corrosion inhibitor concentrate having a pH of above 7 and consisting essentially of a concentrated aqueous solution of zinc polyphosphate as active ingredient, formed by adding an aqueous solution of a zinc salt to an aqueous solution containing about 35–60% by weight tetrapotassium pyrophosphate, with stirring, to form thereby a floc, and continuing stirring until the floc is dissolved.

20. A corrosion inhibitor concentrate according to claim 1, having a pH between about 8.0 and 10.0.

21. A method of preparing a corrosion inhibitor concentrate having a pH of above 7 and consisting essentially of a concentrated aqueous solution of zinc polyphosphate as active ingredient, comprising the steps of adding an aqueous solution of a zinc salt to an aqueous solution containing about 35–60% by weight tetrapotassium pyrophosphate, with stirring, to form thereby a floc, and continuing stirring until the floc is dissolved.

* * * * *